(12) United States Patent
Xu

(10) Patent No.: US 11,045,756 B2
(45) Date of Patent: Jun. 29, 2021

(54) MULTI-MECHANISM WET DUST REMOVAL APPARATUS AND DUST REMOVAL METHOD

(71) Applicant: SHANDONG YUNQING ENVIRONMENTAL SCI-TECH CO., LTD, Shandong (CN)

(72) Inventor: Zhi Xu, Shanghai (CN)

(73) Assignee: SHANDONG YUNQING ENVIRONMENTAL SCI-TECH CO., LTD, Jinan (CN)

( * ) Notice: Subject to any disclaimer, the term of this patent is extended or adjusted under 35 U.S.C. 154(b) by 248 days.

(21) Appl. No.: 16/314,839

(22) PCT Filed: Jul. 3, 2017

(86) PCT No.: PCT/CN2017/091400
§ 371 (c)(1),
(2) Date: Jan. 2, 2019

(87) PCT Pub. No.: WO2018/006766
PCT Pub. Date: Jan. 11, 2018

(65) Prior Publication Data
US 2019/0308130 A1   Oct. 10, 2019

(30) Foreign Application Priority Data
Jul. 5, 2016   (CN) .......................... 201610524740.4

(51) Int. Cl.
*B01D 50/00*   (2006.01)
*B01D 45/02*   (2006.01)
(Continued)

(52) U.S. Cl.
CPC .......... *B01D 50/004* (2013.01); *B01D 45/02* (2013.01); *B01D 45/04* (2013.01); *B01D 47/06* (2013.01)

(58) Field of Classification Search
None
See application file for complete search history.

(56) References Cited

U.S. PATENT DOCUMENTS 1,388,812 A * 8/1921 Geesman ............... B01D 47/06
4,145,191 A * 3/1979 Kunchal et al. ....... B01D 47/06
(Continued)

FOREIGN PATENT DOCUMENTS

CN   1167015 A   12/1997
CN   2330404 Y   7/1999
(Continued)

OTHER PUBLICATIONS

Translation of FR 2477879 A1,2020, Espacenet, description, all pages (Year: 2020).*

(Continued)

*Primary Examiner* — Christopher P Jones
*Assistant Examiner* — Brit E. Anbacht
(74) *Attorney, Agent, or Firm* — Oliff PLC

(57) ABSTRACT

A multi-mechanism wet dust removal apparatus that circulates water and removes ambient dust, and a dust removal method. The multi-mechanism wet dust removal apparatus includes a dust collecting device, a dust settling and air-water separation device, a water circulating device, and a dust discharging device. The dust removal is achieved by dust collecting, dust settling, air-water separation and dust discharging. Water can be recycled and the dust removal method integrates multiple dust removal mechanisms.

3 Claims, 2 Drawing Sheets

(51) Int. Cl.
    *B01D 45/04*     (2006.01)
    *B01D 47/06*     (2006.01)

(56) References Cited

U.S. PATENT DOCUMENTS

| | | | | |
|---|---|---|---|---|
| 4,986,838 A | * | 1/1991 | Johnsgard | B01D 47/06 |
| 5,017,201 A | * | 5/1991 | Park | B01D 47/02 |
| 2019/0308130 A1 | * | 10/2019 | Xu | B01D 47/06 |

FOREIGN PATENT DOCUMENTS

| | | | | |
|---|---|---|---|---|
| CN | 2383576 Y | | 6/2000 | |
| CN | 102172451 A | | 9/2011 | |
| CN | 105999923 A | | 10/2016 | |
| FR | 2477879 A1 | * | 9/1981 | A61L 9/00 |
| JP | 2005-125201 A | | 5/2005 | |

OTHER PUBLICATIONS

Sep. 20, 2017 International Search Report issued in International Patent Application No. PCT/CN2017/091400.

* cited by examiner

MULTI-MECHANISM WET DUST REMOVAL APPARATUS AND DUST REMOVAL METHOD

CROSS-REFERENCE TO RELATED APPLICATIONS

This application is a national stage entry of PCT/CN2017/091400, filed on Jul. 3, 2017, which claims priority to Chinese Patent Application 201610524740.4, filed on Jul. 5, 2016, the disclosures of each of which are hereby incorporated by reference.

BACKGROUND

Technical Field

The present invention relates to the dust removal field, in particular to a multi-mechanism wet dust removal apparatus that circulates water and a dust removal method.

Description of Related Art

The dust pollution generated during the production and processing can cause harm to the health of the operating personnel, and even the potential safety hazard of explosion may exist. An effective dust removal apparatus and dust removal method can not only improve the working environment of a workshop, it can also guarantee safety in production and prevent the air pollution. The common bag type dust removal has the problems of a short ash removing period, easiness in blockage of the filter bag, a high maintenance cost, poor labor conditions, etc., the electrostatic dust removal has the problems of limited working environment, large area occupation, flammability and explosion, etc., and the wet dust removal has the problems of low working efficiency, large water consumption and sewage treatment, etc.

SUMMARY

The problem to be solved in the present invention is addressed by a multi-mechanism wet dust removal apparatus and dust removal method which is high in dust removal efficiency, energy conservation, and environmental protection, and the apparatus circulates water.

In order to solve the aforesaid problems, the present invention adopts the following technical solution: a multi-mechanism wet dust removal apparatus that circulates water, comprising a dust collecting device, a dust settling and air-water separation device, a water circulating device, and a dust discharging device.

The dust collecting device comprises a dust removal fan drum and at least a section of coaxial multi-ring nozzle which is arranged along the axis direction inside the dust removal fan drum. Vents are distributed on the pipe wall of each section of coaxial multi-ring nozzle, the upper end of the dust removal fan drum is provided with a filtration inlet, which is used for only filtering substances such as paper, leaves, plastics, etc. which are not sunk into water, and the lower end of the dust removal fan drum is connected with the dust settling and air-water separation device.

The dust settling and air-water separation device comprises an annular gas-liquid diversion ring groove which is connected with the lower end of the dust removal fan drum in a sealing manner, it also comprises a ring groove diversion pipe and a sedimentation water tank which are positioned below the gas-liquid diversion ring groove, the gas-liquid diversion ring groove bottom is provided with at least one drain port, the upper end of the ring groove diversion pipe is connected to the drain port, the lower end is extended into the sedimentation water tank, and the extension into the bottom of the sedimentation water tank is more beneficial to dust settlement. The ring groove diversion pipe can be arranged such that it is perpendicular or inclined to the water surface. A diversion pipe for concentrated water containing dust is arranged in the axis direction of the gas-liquid diversion ring groove. The lower end of the said diversion pipe for concentrated water containing dust is extended into the sedimentation water tank, and the extension into the bottom of the sedimentation water tank is more beneficial to dust settlement. The diversion pipe for concentrated water containing dust can be arranged such that it is perpendicular or inclined to the water surface, and the upper end is extended out of the upper end of the sedimentation water tank. The upper end of the diversion pipe for concentrated water containing dust is located below the gas-liquid diversion ring groove, its outer diameter is slightly greater than or equal to the inner diameter of the gas-liquid diversion ring groove, which does not interfere with the installation of the ring groove diversion pipe and can prevent water droplets containing dust falling from the central zone of the dust removal fan drum from directly falling into the sedimentation water tank. Meanwhile the airflow section between the gas-liquid diversion ring groove and the upper end of the diversion pipe for concentrated water containing dust is smaller than the airflow section of the gas-water separation chamber outer barrel. The variation from a small section to a large one enables the flow speed of gas to be changed from high to low, the water droplets contained in gas are settled from the overhead of air-water separation chamber outer barrel under the function of centrifugal force and gravity, and further air-water separation is achieved.

The water circulating device comprises an overflow groove which is arranged outside the upper end of the sedimentation water tank. The overflow groove is communicated with the upper end of the sedimentation water tank. The overflow groove is connected with a clean water tank, and the clean water tank is connected to the upper end of the coaxial multi-ring nozzle by a water pump.

The dust discharging device is arranged as an inclined upward spiral conveying pipe structure, the lower end of which is connected to the lower end of the sedimentation water tank, the pipe wall on the side of the lower end of the structure opposite to the sedimentation water tank is provided with an outwardly protruding water diversion channel, and the said water diversion channel is connected with the sedimentation water tank through the return water channel.

The dust removal method based on the above multi-mechanism wet dust removal apparatus comprises the following steps:

Step I: Dust Collection

Air containing dust is introduced through the filtration inlet on the upper end of the dust removal fan drum, the coaxial multi-ring nozzle is controlled to spray water, air containing dust penetrates through the water curtain formed by the spraying of the coaxial multi-ring nozzle, and the impact is generated by the relative movement of dust and water droplets.

Step II: Dust Settling

The water droplets containing dust which flows down along the inner wall of the dust removal fan drum and the water droplets containing dust which directly flows down from the central zone of the dust removal fan drum are guided into the bottom of the sedimentation water tank respectively through the ring groove diversion pipe and the diversion pipe for concentrated water containing dust, and dust in dust-containing water entering the bottom of the sedimentation water tank is settled under the function of its own gravity and inertia. The gas-liquid diversion ring groove and the diversion pipe for concentrated water containing dust prevent water containing dust which directly falls into the sedimentation water tank from directly entering the overflow groove without any separation, and the ring groove diversion pipe and the diversion pipe for concentrated water containing dust are used for directly guiding the water droplets containing dust into the bottom of the sedimentation water tank, which increases the separation efficiency.

Step III: Air-Water Separation

Gas treated by the dust removal fan drum flows into a larger external space through the reserved airflow passage between the gas-liquid diversion ring groove and the upper port of diversion pipe for concentrated water containing dust. The flowing of water droplets containing dust into the gas-liquid diversion ring groove along the inner wall of the dust removal fan drum prevents a large amount of water droplets containing dust from being contacted with the gas flowing at high speed from the airflow passage in the lower part of the gas-liquid diversion ring groove, so that the probability that the water droplets are taken away is reduced, and the air-water separation is enabled to be simple and efficient.

Step IV: Dust Discharging

Dust settled in the bottom of the sedimentation water tank is discharged through the dust discharging device of the spiral conveying pipe structure. Water and dust are in the upper and lower stratified state in the spiral conveying pipe. The spiral conveying pipe is only used for discharging dust instead of water, and water is introduced into the sedimentation water tank through the return water channel for circulation use.

Preferably, in the said Step I, air containing dust is controlled to enter along the tangential direction of the inner wall of the dust removal fan drum through the filtration inlet, and dust makes an inclined downward movement along the inner wall of the dust removal fan drum under the function of its own gravity and inertia.

The invention integrates multiple dust removal mechanisms, and the dust removal efficiency is helpful for removing ambient dust pollution. The work process is not limited by volatile matter, specific resistance and inlet concentration; the danger of spontaneous combustion and explosion is prevented; secondary pollution of ash removal is prevented; the problem that a filtering bag is likely to be blocked and damaged is prevented; the air source does not need to be compressed; water circulation use is achieved, no sewage is drained, and therefore water is saved; sewage treatment is not needed, and therefore the apparatus and method are environmentally friendly; ash removal and dust removal can be carried out at the same time, the apparatus can run for a long time, and shutdown for ash removal is not needed.

DETAILED DESCRIPTION

Figure 1:
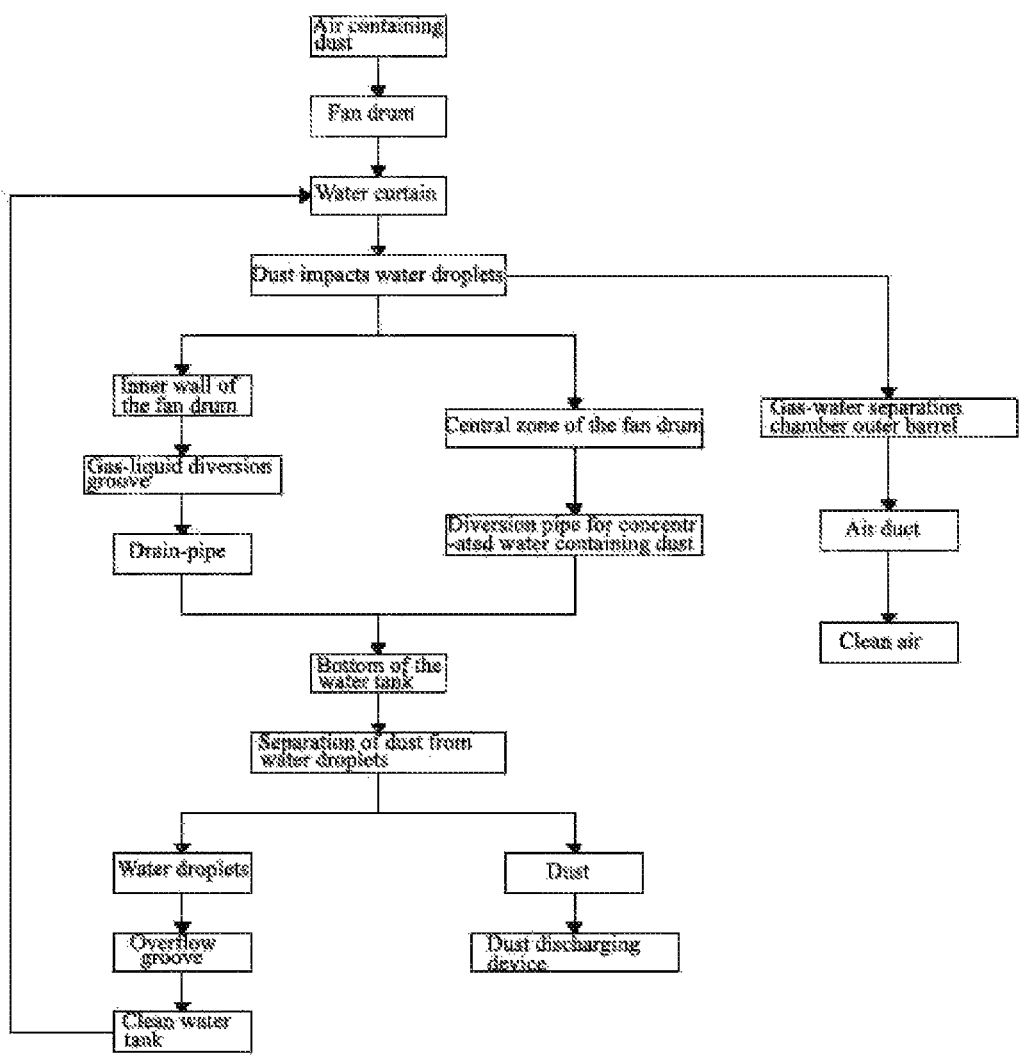
FIG. 1 is the structure diagram of the dust removal apparatus.

As shown in FIG. 1, a multi-mechanism wet dust removal apparatus that circulates water, comprising a dust collecting device, a dust settling and air-water separation device, a water circulating device and a dust discharging device is illustrated.

The dust collecting device comprises a dust removal fan drum 2 and at least a section of coaxial multi-ring nozzle 6 which is arranged along the axis direction inside the dust removal fan drum 2. Vents are distributed on the pipe wall of each section of coaxial multi-ring nozzle 6, the upper end of the dust removal fan drum 2 is provided with a filtration inlet 1, and the lower end of the dust removal fan drum 2 is connected with the dust settling and air-water separation device.

The dust settling and air-water separation device comprises an annular gas-liquid diversion ring groove 7 which is connected with the lower end of the dust removal fan drum 2 in a sealing manner, it also comprises a ring groove diversion pipe 8 and a sedimentation water tank 10 which are positioned below the gas-liquid diversion ring groove 7, the gas-liquid diversion ring groove 7 bottom is provided with at least one drain port 20, the upper end of the ring groove diversion pipe 8 is connected to the drain port 20, the lower end is extended into the sedimentation water tank 10; a diversion pipe for concentrated water containing dust 9 is arranged in the axis direction of the gas-liquid diversion ring groove 7; the lower end of the said diversion pipe for concentrated water containing dust 9 is extended into the sedimentation water tank 10, and the upper end is extended out of the upper end of the sedimentation water tank 10; the upper end of the diversion pipe for concentrated water containing dust 9 is located below the gas-liquid diversion ring groove 7, its outer diameter is slightly greater than or equal to the inner diameter of the gas-liquid diversion ring groove 7.

The water circulating device comprises an overflow groove 11 which is arranged outside the upper end of the sedimentation water tank 10. The overflow groove 11 is communicated with the upper end of the sedimentation water tank 10. The overflow groove 11 is connected with a clean water tank 12, and the clean water tank 12 is connected to the upper end of the coaxial multi-ring nozzle 6 by a water pump 13.

The dust discharging device is arranged as an inclined upward spiral conveying pipe 15 structure, the lower end of which is connected to the lower end of the sedimentation water tank 10, the pipe wall on the side of the lower end of the structure opposite to the sedimentation water tank 10 is provided with an outwardly protruding water diversion channel 19, and the said water diversion channel 19 is connected with the sedimentation water tank 10 through the return water channel 18.

Figure 2:
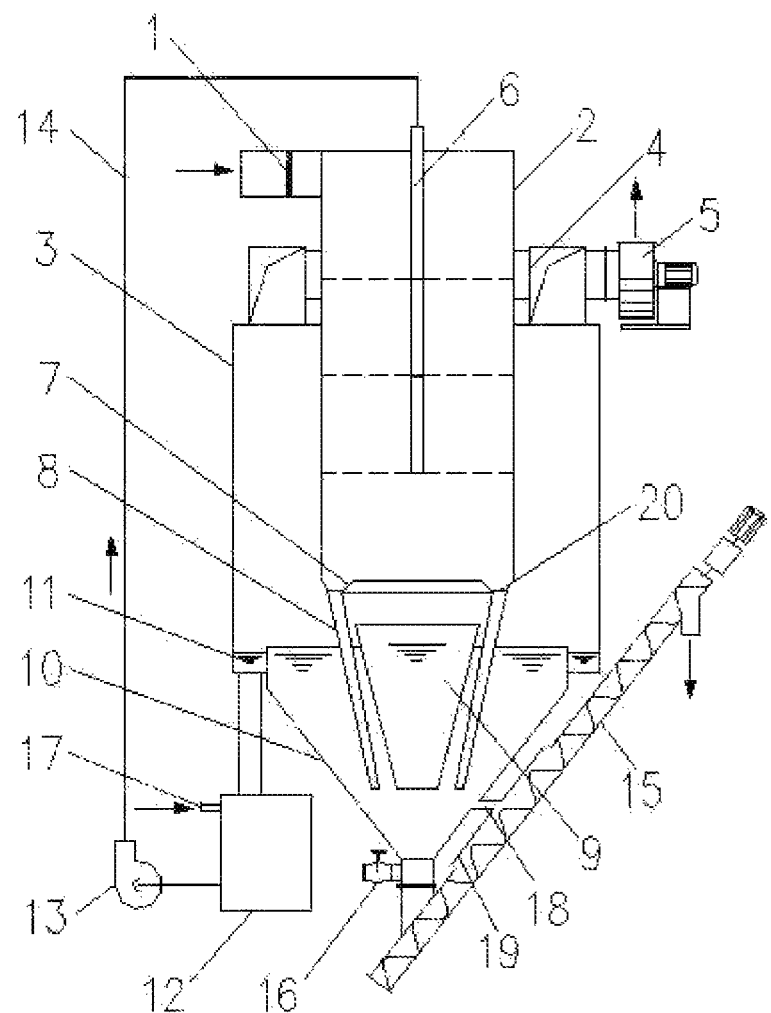
FIG. 2 is the work flow diagram of the dust removal method.

As shown in FIG. 2, a dust removal method for the multi-mechanism wet dust removal apparatus that circulates water is provided, and the method comprises the following steps:

Step I: Dust Collection

Air containing dust is introduced through the filtration inlet 1 along the tangential direction of the inner wall of the dust removal fan drum 2, the coaxial multi-ring nozzle 6 is controlled to spray water, and dust makes an inclined downward movement along the inner wall of the dust removal fan drum 2 under the function of its own gravity and inertia, and at least one level of water curtain from top to bottom is formed through the coaxial multi-ring nozzle 6. The water flow is dispersed into drops of water after it is sprayed for a distance by the coaxial multi-ring nozzle 6, after the drops of water is contacted with the inner wall of the dust removal fan drum 2, they are splashed into water droplets which are small in particle size and abundant in number, while the water flow density in the central zone of the dust removal fan drum 2 is the highest, which is the most beneficial for dust collection. Air containing dust penetrates through the water curtain formed by the spraying of the coaxial multi-ring nozzle, and the impact is generated by the relative movement of dust and water droplets. This process integrates the dust removal mechanisms of cyclone centrifugal force, inertial collision, inertial impact, wetting, condensation, etc.

Step II: Dust Settling

The water droplets containing dust which flows down along the inner wall of the dust removal fan drum 2 and the water droplets containing dust which directly flows down from the central zone of the dust removal fan drum 2 are guided into the bottom of the sedimentation water tank 10 respectively through the ring groove diversion pipe 8 and the diversion pipe for concentrated water containing dust 9, and dust in dust-containing water entering the bottom of the sedimentation water tank 10 is settled under the function of its own gravity and inertia. Water that is separated from most of the dust slowly rises into the overflow groove 11 which is communicated with the upper end of the sedimentation water tank 10, and then it is in circulation use through the clean water tank 12 and the water pump 13. A small amount of fine dust in the circulating water which cannot be settled is low in concentration, and it cannot affect the capability of continuous dust collection by water droplets.

Step III: Air-Water Separation

Gas treated by the dust removal fan drum 2 flows into a larger external space through the reserved airflow passage between the gas-liquid diversion ring groove 7 and the upper port of diversion pipe for concentrated water containing dust 9. As the airflow section between the gas-liquid diversion ring groove 7 and the upper port of the diversion pipe for concentrated water containing dust 9 is smaller than the airflow section of the gas-water separation chamber outer barrel 3, the variation from a small airflow section to a large one enables the flow speed of gas to be changed from high to low, the water droplets are separated from the airflow under the function of centrifugal force and gravity, and gas is exhausted from the exhaust duct 4 after dehydration.

Step IV: Dust Discharging

Dust settled in the bottom of the sedimentation water tank is discharged through the dust discharging device of the spiral conveying pipe structure. Water and dust are in the upper and lower stratified state in the spiral conveying pipe. The spiral conveying pipe is only used for discharging dust instead of water, and water is introduced into the sedimentation water tank through the return water channel for circulation use.

Although the above paragraphs describe the embodiment of the invention in conjunction with the figures, the disclosure is not limited to the above-embodiment. Persons of ordinary skill in the art should understand that, various modifications can be made without conducting any creative work and such modifications could still be within the scope of the claimed invention.

LISTING OF ILLUSTRATED COMPONENTS

1. Filtration inlet, 2. Dust removal fan drum, 3. Gas-water separation chamber outer barrel, 4. Exhaust duct, 5. Fan, 6. Coaxial multi-ring nozzle, 7. Gas-liquid diversion ring groove, 8. Ring groove diversion pipe, 9. Diversion pipe for concentrated water containing dust, 10. Sedimentation water tank, 11. Overflow groove, 12. Clean water tank, 13. Water pump, 14. Water pipe, 15. Spiral conveying pipe, 16. Emptying valve, 17. Water replenishing pipe, 18. Return water channel, 19. Water diversion channel, and 20. Drain port.

The invention claimed is:

1. A multi-mechanism wet dust removal apparatus that circulates water, comprising a dust collecting device, a dust settling and air-water separation device, a water circulating device and a dust discharging device, wherein:

the dust collecting device comprises a dust removal fan drum and at least a section of coaxial multi-ring nozzle which is arranged along an axis direction inside the dust removal fan drum, wherein vents are distributed on a pipe wall of each section of coaxial multi-ring nozzle, an upper end of the dust removal fan drum is provided with a filtration inlet, and a lower end of the dust removal fan drum is connected with the dust settling and air-water separation device;

the dust settling and air-water separation device comprises:
an annular gas-liquid diversion ring groove which is connected with the lower end of the dust removal fan drum in a sealing manner, and
a ring groove diversion pipe and a sedimentation water tank which are positioned below the annular gas-liquid diversion ring groove,
the annular gas-liquid diversion ring groove at a bottom portion thereof is provided with at least one drain port, an upper end of the ring groove diversion pipe is connected to the drain port, a lower end of the ring groove diversion pipe is extended into the sedimentation water tank; a diversion pipe for concentrated water containing dust is arranged in the axis direction of the annular gas-liquid diversion ring groove; a lower end of the diversion pipe for concentrated water containing dust is extended into the sedimentation water tank, and an upper end of the diversion pipe is extended out of an upper end of the sedimentation water tank; the upper end of the diversion pipe for concentrated water containing dust is located below the annular gas-liquid diversion ring groove, and the upper end of the diversion pipe has an outer diameter that is greater than or equal to an inner diameter of the annular gas-liquid diversion ring groove;

the water circulating device comprises an overflow groove which is arranged outside the upper end of the sedimentation water tank, the overflow groove communicates with the upper end of the sedimentation water tank, the overflow groove is connected with a clean water tank, and the clean water tank is connected to the upper end of the coaxial multi-ring nozzle by a water pump; and the dust discharging device is arranged as an inclined upward spiral conveying pipe structure, a lower end of which is connected to a lower end of the sedimentation water tank, a wall on the side of the lower end of the dust discharging device opposite to the sedimentation water tank is provided with an outwardly protruding water diversion channel, and the outwardly protruding water diversion channel is connected with the sedimentation water tank through a return water channel.

2. A dust removal method using the multi-mechanism wet dust removal apparatus that circulates water according to claim 1, wherein the method comprises the following steps:

a first step of controlling air containing dust to be introduced through the filtration inlet on the upper end of the dust removal fan drum, and controlling the coaxial multi-ring nozzle to spray water, whereby air containing dust penetrates through a water curtain formed by the spraying of the water by the coaxial multi-ring nozzle to produce water containing dust, and an impact is generated by relative movement of dust and the water;

a second step of causing the water containing dust to flow down along an inner wall of the dust removal fan drum to be guided into the bottom of the sedimentation water tank through the ring groove diversion pipe, and causing the water containing dust to directly flow down a central zone of the dust removal fan drum to be guided into the bottom of the sedimentation water tank through the diversion pipe, wherein the dust in the water containing the dust enters the bottom of the sedimentation water tank and settles due to gravity acting on the dust;

a third step of causing gas treated by the dust removal fan drum to flow into a larger external space through an airflow passage between the annular gas-liquid diversion ring groove and the upper port of diversion pipe; and a fourth step of causing dust settled in the bottom of the sedimentation water tank to be discharged through the dust discharging device of the inclined upward spiral conveying pipe structure, and causing water to be introduced into the sedimentation water tank through the return water channel.

3. The dust removal method according to claim 2, wherein in the first step, air containing dust is controlled to enter along a tangential direction of the inner wall of the dust removal fan drum through the filtration inlet, and the dust makes an inclined downward movement along the inner wall of the dust removal fan drum due to gravity acting on the dust.

* * * * *